United States Patent
Okazaki

(10) Patent No.: US 6,627,271 B1
(45) Date of Patent: Sep. 30, 2003

(54) OVERLAYING REPLICA, HEAPING REPLICA AND METHODS OF MANUFACTURING SAME

(75) Inventor: Chizuko Okazaki, Obihiro (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 09/539,425

(22) Filed: Mar. 30, 2000

(30) Foreign Application Priority Data

Apr. 2, 1999 (JP) .......................................... 11-131810
Oct. 1, 1999 (JP) .......................................... 11-315724

(51) Int. Cl.$^7$ ................................................ B44J 7/00
(52) U.S. Cl. ........................ 428/16; 156/59; 156/329; 428/15
(58) Field of Search ............................. 359/22, 23, 24; 156/329, 59; 428/13, 14, 15, 16, 17, 18

(56) References Cited

U.S. PATENT DOCUMENTS

| 3,616,005 A | | 10/1971 | Wetstone .................... 156/182 |
| 3,868,283 A | * | 2/1975 | Scheyer ....................... 156/58 |
| 5,458,932 A | * | 10/1995 | Zinbarg et al. ............... 428/16 |
| 5,989,095 A | * | 11/1999 | Wotton ........................ 446/385 |

OTHER PUBLICATIONS

PaperToleKits.com (undated web site).*
Amazon.com review of "Creative Three–Dimensional Decoupage" by Debbie Sellers, book dated 1998.*

* cited by examiner

Primary Examiner—D. Lawrence Tarazano
(74) Attorney, Agent, or Firm—Flynn, Thiel, Boutell & Tanis, P.C.

(57) ABSTRACT

A replica of fossil or the like can be handily manufactured using color prints obtained by photographing the fossil without preparing a mother mold. An overlaying replica is manufactured by preparing a plurality of prints, each having the same size, and obtained by photographing a collected specimen from given angles, cutting specimen parts to form a plurality of specimen prints, bonding said specimen prints by a solid paste one by one substantially in the same direction while they are overlaid on one another and kept at a given interval therebetween. A heaping replica is manufactured by preparing two prints, each having the same size and obtained by photographing a collected specimen from given angles, cutting specimen parts to form two specimen prints, molding a specimen dimensionally on the first specimen print by plastics using a spatula, and overlaying and bonding the second specimen print onto the molded three-dimensional specimen.

11 Claims, 3 Drawing Sheets

OVERLAYING REPLICA, HEAPING REPLICA AND METHODS OF MANUFACTURING SAME

BACKGROUND OF THE INVENTION

1. Field of the Invention

The invention relates to an overlaying replica, a heaping replica and a method of manufacturing the overlaying replica using color prints which are prepared by photographing an original specimen, inputting the photographed specimen to a personal computer, printing out the picture or color copying the photographed scene, and a method of manufacturing the heaping replica using the same color prints.

2. Prior Art

A conventional fossil replica is manufactured by the following steps.

1. Cleaning a fossil, then preparing a protection film on an original specimen by silicone rubber.
   a. filling a portion of an original specimen from which plaster is not exfoliated with rubber clay in advance of preparing the protection film,
   b. preparing a wooden frame at a position away from the original specimen by about 3 to 5 cm (an interval between the original specimen and the wooden frame has such a space through which the operator's hands pass),
   c. rendering a surface of the original specimen by which a replica is to be manufactured exposed to a surface of volcanic ash while rendering the remaining portion of the original specimen buried in the volcanic ash and fixed therein,
   d. pouring a material prepared by adding curing resin to a silicone rubber resin (hereinafter referred to as the silicone rubber solution) between the wooden frame and the original specimen on the surface of the volcanic ash as thin as possible,
   e. drying the silicone rubber solution and smoothing silicone rubber resin around the original specimen using a cutter knife or the like if the surface of the silicone rubber resin is not smooth,
   f. pouring a liquefied silicone rubber resin in the entire wooden frame including the original specimen and sticking gauze onto an entire surface of the specimen before the silicone rubber solution is dried, and
   g. pouring the silicone rubber solution a third time in a manner that the gauze is hidden.

2. Preparing a mother mold based on the original specimen to which the protection film is stuck.
   a. pouring plaster for a first time in the wooden frame covered with the protection film thereon,
   b. after pouring plaster a second time in the wooden frame, sticking a glass mesh on the plaster before the plaster dries,
   c. pouring plaster a third time and taking the original specimen out of the volcanic ash in the wooden frame after the original specimen is dried, then removing the wooden frame,
   d. removing the silicone rubber solution that is poured first, then applying a plastic curing agent to the inner part of a mother mold, whereby the surface of the mother mold is protected and the plaster is prone to exfoliate when manufacturing the replica, and
   e. manufacturing a backside of the replica in the same manner as the front side, when preparing the mother mold in a complete carrier.

3. Manufacturing a replica based on the mother mold.
   a. pouring plaster that is dissolved in water into a mother mold (the plaster has a consistency of not dripping when a rod that has stirred the dissolved plaster is pulled out),
   b. vibrating the replica to let surplus air out from the mother mold because air is prone to enter therein,
   c. taking the replica out from the mother mold when it is cured and removing an unnecessary portion of the replica at the jointing surface of the mother mold,
   d. coloring the replica so that the replica appears more like its subject,
   e. applying a synthetic resin to the replica and subjecting it to waxing to manufacture a complete replica, and
   f. sticking front and back surfaces when rendering the replica three-dimensionally complete.

It has taken time and expense to prepare the mother mold for manufacturing the replica, and it has required mother molds corresponding to or satisfying the number of operators who manufacture the replicas from the mother molds. However, it is hardly possible to prepare the same mother molds corresponding to or satisfying the number of operators.

It is considered that many operators cannot manufacture replicas from mother molds at the same time, much less prepare mother molds by the number of all operators.

Moreover, although elementary schoolchildren and junior high school students can hardly prepare color tones of the original specimen by compounding paints or the like, it is desired that replicas can be easily manufactured, even by elementary schoolchildren (both parents and their children in case of lower grades).

Even if these replicas have been manufactured carefully, they lack an ornamental property and in many cases they have been put deep in their desks, and hence operators merely found satisfaction in manufacturing the replicas.

If various objects are decorated as replicas, they may be worth seeing from an aesthetic point of view as indoor decorations.

When they display the replicas at places to be seen always, they are impressed by events when they manufacture the replicas and remember affairs which they learned at that time.

SUMMARY OF THE INVENTION

It is an object of the invention to solve the foregoing problems and provide an overlaying replica, a heaping replica and methods of manufacturing these replicas that are worth seeing from an aesthetic point of view at a low cost and that comprise simple steps.

The inventors have studied the foregoing problems comprehensively and found that when a picture obtained by photographing an original specimen is inputted to a personal computer and the picture processed in the personal computer is outputted from the personal computer, or a picture obtained by photographing an original specimen is color copied to prepare a color print, the printed out picture and the color print can be used to omit time and labor in the preparation of a mother mold in the process of manufacturing a replica.

A plurality of prints, each having the same size and prepared by photographing a collected specimen from given angles, are prepared, and portions constituting specimens are cut to prepare a plurality of specimen prints, and the specimen prints are overlaid on and bonded to one another by a solid paste while each print occupies a given space and is directed in the same direction, so that the specimen prints are overlaid on one another three-dimensionally to form an overlaying replica.

Alternatively, two prints having the same size and prepared by photographing a collected specimen from given angles are prepared, and portions constituting specimens are cut to prepare two specimen prints, and mold a specimen three-dimensionally by clay using a spatula or the like on the first specimen print, then overlaying the second specimen print on the specimen of clay so as to stick the former to the latter, thereby forming a heaping replica.

In manufacturing the heaping replica, the reason that the second specimen print is similar to and slightly larger than the first specimen print is caused by the fact that in a case where the specimen is molded by plastic material such as clay to render the mold high, the surface of a molded article becomes large so that the specimen prints having the same size cannot cover the surface of the molded article.

As a fossil, there are, for example, a gingko tree, filicite, trilobite, limulus, ammonite, nautilus, of which if the combination thereof, for example, if the trilobite and limulus, ammonite and nautilus are combined with each other, comparative specimens of extinct and existing or living organisms can be manufactured, and displayed like a tapestry or can be put in practical use as an indoor decoration.

Further, although a replica and a botanical specimen may be manufactured individually, it is possible to manufacture two or more kinds of specimens in one work which are freely combined with each other so that operators can compare and study extinct and living organisms while enjoying and comparing them with each other.

It is also possible to cut some portions of a specimen in a piece of a picture presenting the change with time of crystallization, geographic formation, and marks showing the life of organisms or the like which are classified by ages in accordance with the individual times where they were formed, so that they are used as a plurality of specimen prints so as to manufacture replicas capable of presenting histories of the replicas systematically at first sight.

It is another feature of the invention to prepare a three-dimensional specimen having a size so as to be carried by a hand or hands to understand the content of the specimen and the size of the object of the specimen ranges from a large one such as a universe to a small one that cannot be seen without using a microscope.

It is preferable to use a paste in the invention that lessens in strain after it is cured, for example, a silicone paste is preferable.

To achieve the above objects, an overlaying replica of the first aspect of the invention is manufactured by preparing a plurality of prints, each having the same size and obtained by photographing a collected specimen from given angles, cutting specimen parts to form a plurality of specimen prints, bonding the specimen prints by a solid paste one by one substantially in the same direction while they are overlaid on one another and kept at a given interval therebetween.

A double-sided overlaying replica of the second aspect of the invention comprises a front side three-dimensionally overlaying replica manufactured by preparing a plurality of prints, having the same size and obtained by photographing a collected specimen from given angles, cutting specimen parts to form a plurality of specimen prints, bonding the specimen prints by a solid paste one by one substantially in the same direction while they are overlaid on one another and kept at a given interval therebetween, and a back side three-dimensionally overlaying replica manufactured by preparing a plurality of prints each having the same size and obtained by photographing the collected specimen while it is turned over from given angles, cutting specimen parts to form a plurality of specimen prints, bonding the specimen prints by a solid paste one by one substantially in the same direction while they are overlaid on one another and kept at a given interval therebetween, wherein the front and back side three-dimensionally overlaying replicas are overlaid on one another to be integrated with each other.

A method of manufacturing an overlaying replica according to a third aspect of the invention comprises the steps of preparing a plurality of prints, having the same size and obtained by photographing a collected specimen from given angles, cutting specimen parts to form a plurality of specimen prints, bonding the specimen prints by a solid paste one by one substantially in the same direction while they are overlaid on one another and kept at a given interval therebetween.

A heaping replica according to a fourth aspect of the invention is manufactured by preparing two prints having the same size and obtained by photographing a collected specimen from given angles, cutting specimen parts to form two specimen prints, molding a specimen dimensionally on the first specimen print by plastics using a spatula, and overlaying and bonding the second specimen print onto the molded three-dimensional specimen.

A double-sided heaping replica according to a fifth aspect of the invention comprises a front side three-dimensionally heaping replica manufactured by preparing two prints having the same size and obtained by photographing a collected specimen from given angles, cutting specimen parts to form two specimen prints, molding the specimen dimensionally on the first specimen print by plastics using a spatula, and overlaying and bonding the second specimen print onto the molded three-dimensional specimen, and a back side three-dimensionally heaping replica manufactured by preparing two prints having the same size and obtained by photographing the collected specimen while it is turned over from given angles, cutting specimen parts to form two specimen prints, molding the specimen dimensionally on the first specimen print by plastics using a spatula, and overlaying and bonding the second specimen print onto the molded three-dimensional specimen, wherein the front and back side three-dimensionally heaping replicas are overlaid on one another to be integrated with each other.

The invention is now described in detail hereunder about processes and conditions under which replicas of the invention are manufactured but it is not limited to these embodiments.

PREFERRED EMBODIMENT OF THE INVENTION

First Example (Overlaying Replica)

Figure 1:
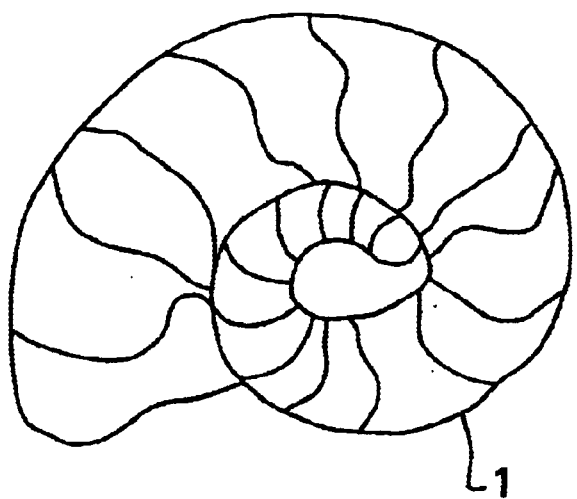
FIG. 1 is a sketch showing a print of an ammonite that is cut from a picture.
Figure 2:
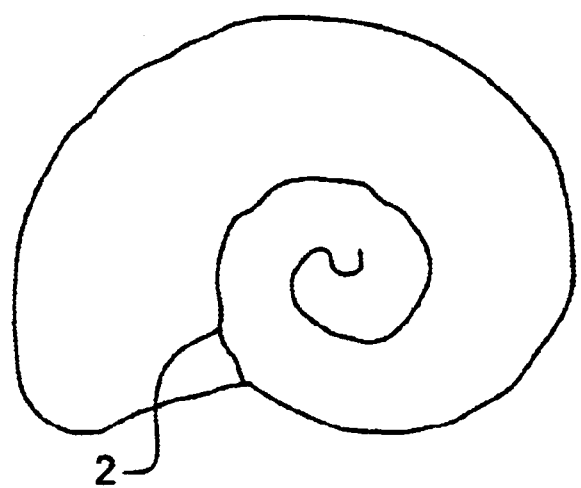
FIG. 2 is a view for explaining how to put scissors to the print of ammonite.
Figure 3:
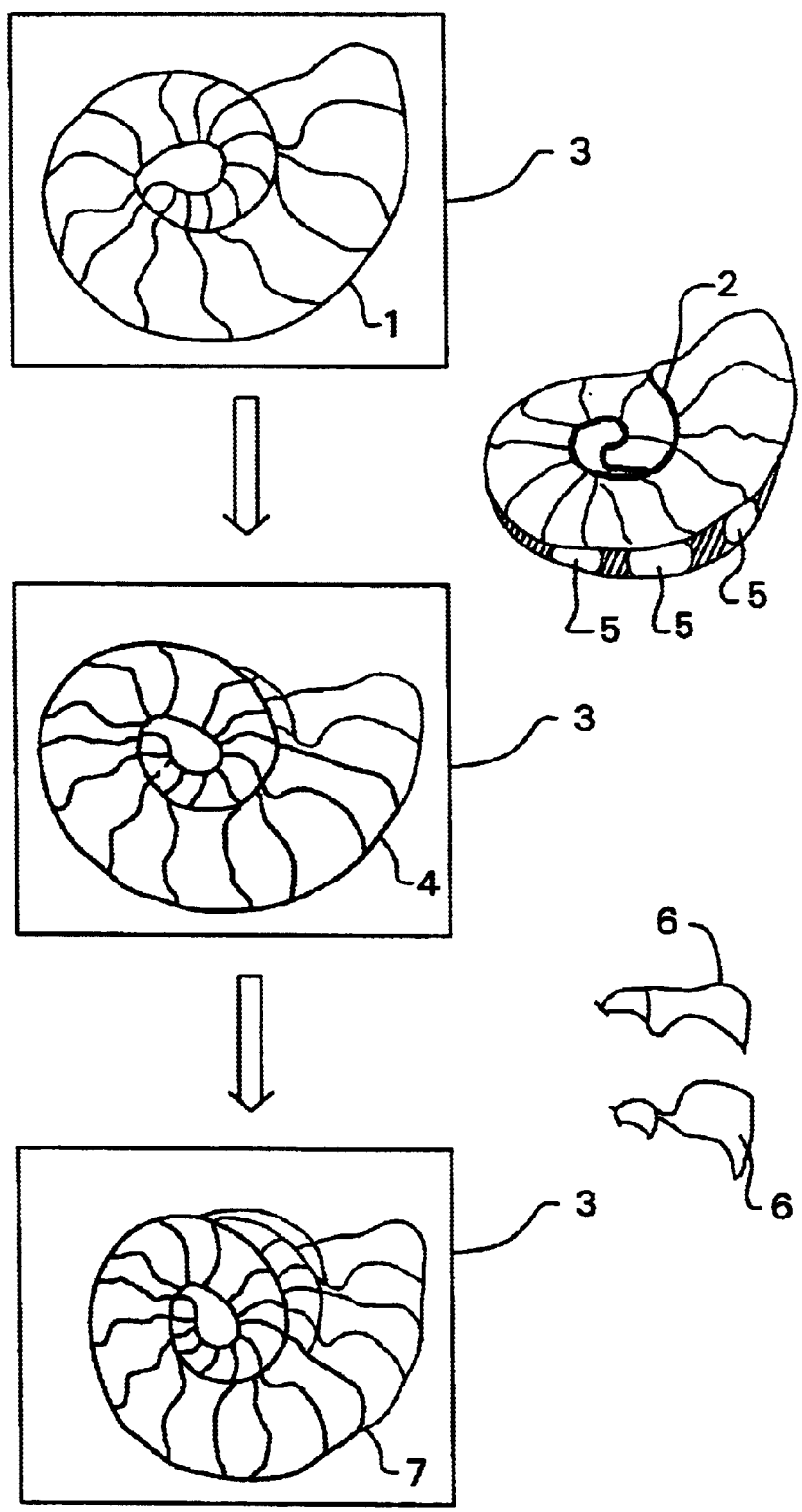
FIG. 3 is a view for explaining how to manufacture an overlaying replica of ammonite.

A method of manufacturing an overlaying replica comprises the following steps.

placing ammonite after it was subject to cleaning, photographing the ammonite from the upper portion thereof, inputting the photograph or picture to a personal computer to process it, and outputting four color prints including a spare one, cutting the first color print with one stroke as shown in FIG. 1, pasting a paste onto an entire back surface of the color print 1 uniformly, then sticking the color print 1 onto a glass plate 3, pressing surplus air and paste quickly and quietly out of a space between the color print 1 and the glass plate 3 from the center toward the outside thereof by a couple of pieces of tissue paper which are crumpled into a ball or rags so as to prevent surplus air from entering between the color print 1 and the glass plate 3, cutting a second print 4 in the same manner as the first print 1, namely, with one stroke, and putting scissors to the second print 4 along an inner helical design or pattern as shown in FIG. 2 so that the second print 4 can move flexibly on the first print 1 when the second print 4 is placed three-dimensionally on the first color print 1 by silicone paste, placing the second cut print 4 upside down on a working table such as a board made of styrene or a tray for foodstuff that is cleaned well and dried, then squeezing and rounding the cut second print 4 from the inside toward the outside thereof by a modeler along the edge of the second print 4 extending 1 to 2 mm away inward from the edge of the pattern thereof, pasting the second print 4 three-dimensionally one by one on the color print 1, that is pasted on the glass plate 3, by silicone paste 5 at the intervals of 2 to 3 cm using a bamboo spit so that the second print 4 becomes higher helically gradually from the center toward the outside of the ammonite, placing the third print 7 upside down on the working table, then squeezing and rounding the third print 7 by the modeler from the inside of the third print 7 toward the outside thereof, and pasting small pieces 6, that are prepared by cutting the third print 7 at every partition wall, on the first and second prints 1 and 4 while they are varied in height, namely, in the manner that the second print 4 is more varied than the print 1 in height, rounding and pasting small pieces 6 on the first print 1 and second print 4 repeatedly until the replica is completed, and coloring a picture frame prepared for putting a glass plate thereon, and disposing the specimen freely on the glass plate, thereby manufacturing a work that is worth seeing from an aesthetic point of view.

Second Embodiment (Heaping Replica)

Figure 4:
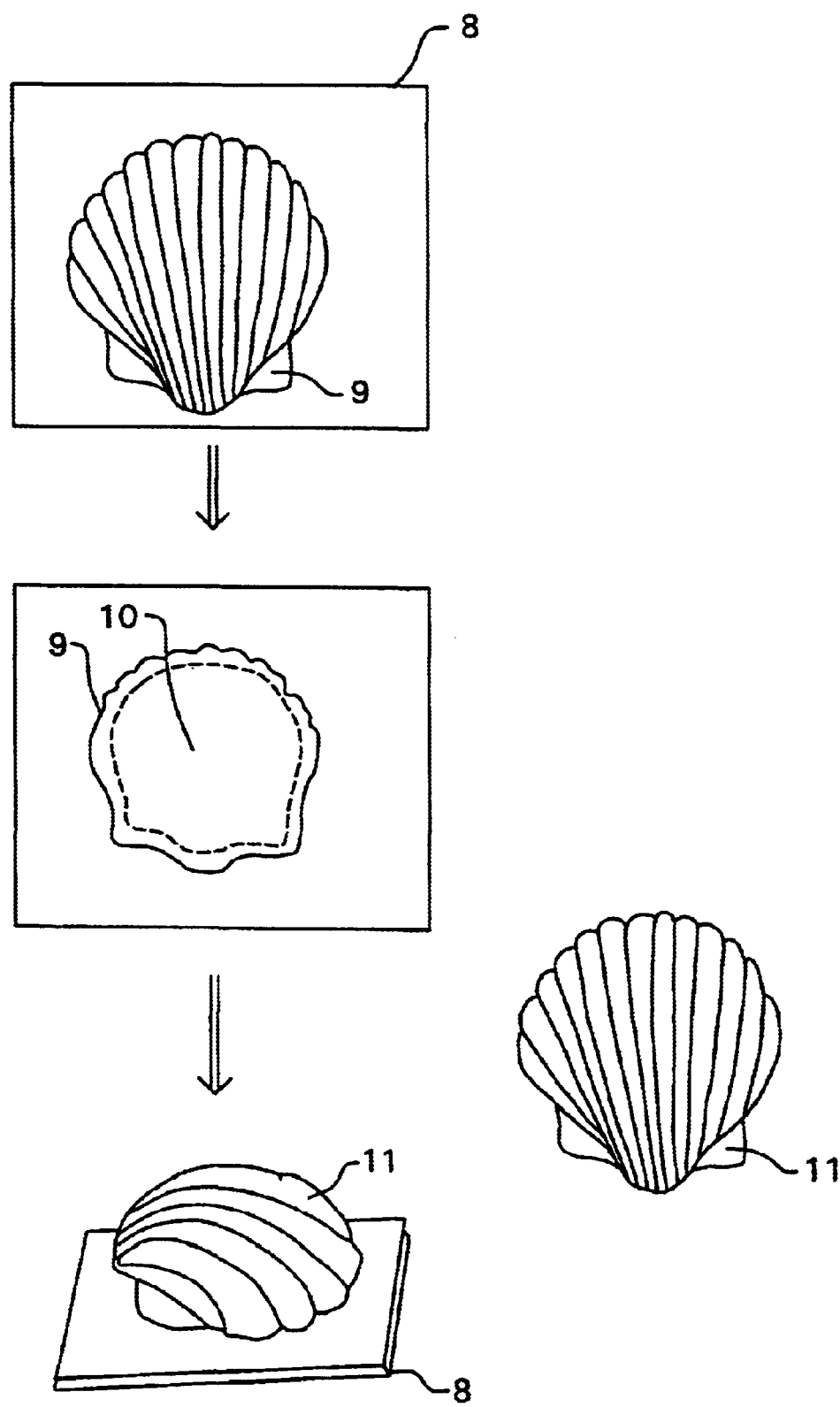
FIG. 4 is a view for explaining how to manufacture a heaping replica of scallop shell.

A method of manufacturing heaping replica comprises the following steps:

placing a fossil (scallop shell) after it was subjected to cleaning, photographing the fossil from a substantially upper portion thereof, inputting a photograph or picture of the fossil to a personal computer to process it, printing out two color prints having the same pattern, applying transfer liquid on the first print by a sponge brush, drying the transfer liquid by a drier, repeating the applying and drying operation in the longitudinal and lateral directions three to four times in total, soaking the print in water for about 30 minutes after the transfer liquid applied on the print has completely dried, placing the print on a glass or the like upside down when the print becomes whitish, rubbing the print from the end thereof by an inner finger to peel off the back paper so as to leave the print in a film shape, washing the film-shaped print in water without applying a heavy load thereto to remove paper scum carefully, then placing the print on old papers to remove moisture therefrom so that the print is naturally dried, using two prints as shown in FIG. 4 to prepare a three-dimensional replica that is very similar to an actual scallop shell, filing off the edge of a plate forming a plate by sand paper along the grain thereof, applying acrylic paint onto the plate, then drying the acrylic print to form a surface processed plate storage part 8 (it is preferable that the surface processed plate 8 is coated smoothly on its surface, an open paper or milk carton that is cleansed and cut open is available readily as the surface processed plate 8), cutting the second print with scissors, soaking the entire print in water, then placing the print on old papers to drain off surplus water, placing a film-shaped print 9 (first specimen print) on the surface processed plate 8 on which bond for woodwork is applied and slightly thinned by water, placing a plastic wrap on the print 9, then quickly pushing surplus air and bond out from a space between the print 9 and the surface processed plate 8 using rags from the center to the outside thereof, then bonding the print 9 on the surface processed plate 8, peeling off wrapped material quickly and wiping away the pushed out bond from the print by wet tissue paper in the manner of tapping it, then letting the print dry naturally, applying acrylic resin onto the print using a sponge brush, drying the acrylic resin using a drier, and then applying the acrylic resin, repeating the applying and drying operation in the longitudinal and lateral directions three to four times, applying an acrylic resin once on the print pasted on the surface processed plate 8 at the portion where it is intended to be heaped, then placing a small amount of paper clay 10 for use in dolls on the print along the line 1 to 2 mm away inward from the edge of the pattern of the print, wherein the paper clay 10 is kneaded by fingertips while pouring water therein so that the paper clay 10 becomes soft like an earlobe, forming irregularities on the surface of the paper clay 10 using a spatula conforming to irregularities of the actual object, applying acrylic resin on the paper clay 10 by fingertips, placing a film-shaped print 11 (second specimen print), that is cut with scissors along the pattern of the print with one stroke, on the paper clay 10, then letting air out of a space between the print and paper clay 10 while forming a shape conforming to the irregularities of the pattern using a modeler (if dried, moisture is supplied by a fingertip to continue the operation) (the film-shaped print 11 (second specimen print) may be similar to and slightly larger than the film-shaped print 9), firmly pressing the edge of the pattern of the print by a modeler, pushing out the surplus paper clay 10, and wiping away the pushed out paper clay 10 using a wet tissue, thereby forming a pre-replica, applying an acrylic resin solution seven to eight times after finely shaping the pre-replica, rubbing the pre-replica as if drawing a circle while moisturizing water restraint paper by water after the acrylic resin solution is dried to remove any irregularity of paste after brushing, washing away cut scum by water, and then wiping away moisture by tissue paper, shaping the pre-replica again by the modeler, applying acrylic resin solution as a finishing agent to dry the pre-replica naturally, and polishing the pre-replica using wax containing silicone therein after it is completely dried, and attaching metal fittings onto the board to complete the replica for use in hanging on a wall, Third Embodiment (Heaping Replica)

A completely three-dimensional replica is manufactured by the following steps:

cleaning a fossil, photographing the front and back of the fossil from an immediately upper portion thereof, inputting a photograph or picture of the fossil to a personal computer to process it, printing out four color prints in total, having the pattern at the front and back thereof, in order to manufacture a complete three-dimensional replica, applying a transfer liquid onto four prepared prints using a brush, drying the transfer liquid using a drier, and then applying a drying operation in the longitudinal and lateral directions three to four times in total (although the transfer liquid is dried using a drier at this time, if the drier is too close to the print, there is a likelihood of generation of air bubbles, and hence the drier is to be away from the work not more than 30 cm), soaking the prints in water for about 30 minutes when the transfer liquid is completely dried, placing the print on a glass or the like upside down when the print becomes whitish, rubbing the print from the end thereof by an inner finger to peel off the back paper so as to leave the print in a film shape, washing the film-shaped print in water without applying a heavy load thereto to remove paper scum carefully, then placing the print on old papers to remove moisture thereof so that the print is naturally dried (the front and back sides of the replica are manufactured at the same), cutting the four prints along the pattern with one stroke, placing transferred prints on the board while exposing the front and back sides thereon, and applying the acrylic resin solution on the prints by fingertip, placing a small amount of paper clay used in dolls on the print along the line 1 to 2 mm away inward from the edge of the pattern of the print, wherein the paper clay is kneaded by fingertips while pouring water therein so that the paper clay becomes soft like an earlobe, applying the acrylic resin solution onto paper clay placed on the prints by fingertip and placing the cut film-shaped prints on the paper clay while exposing the front and back sides thereon, letting air out from a gap between the prints and paper clay while shaping by a modeler conforming to the irregularity of the pattern, firmly pressing the edge of the pattern of the print stuck to the paper clay by a modeler, pushing out the surplus paper clay, and wiping away the pushed out paper clay using a wet tissue, thereby forming a pre-replica, applying an acrylic resin solution seven to eight times after finely shaping the pre-replica, rubbing the pre-replica as if drawing a circle while moisturizing water restraint paper by water after the acrylic resin solution is dried to remove any irregularity of paste after brushing, washing away cut scum by water, and then wiping away moisture by tissue paper, shaping the pre-replica again by the modeler, applying the acrylic resin solution as a finishing agent to dry the pre-replica naturally, removing the pre-replica from the board, applying bond for woodwork to the bottom of the pre-replica, sticking the front and back surfaces thereof, and cutting the surplus part protruding from the pre-replica at the jointing surface thereof with scissors, applying an acrylic resin solution onto the pre-replica one or two times to naturally dry the pre-replica, and polishing the pre-replica using wax containing a silicone therein after it is completely dried, thereby manufacturing a complete three-dimensional replica.

Inasmuch as the overlaying replica and heaping replica according to the invention have utilized color photographs or pictures of an original specimen, it is not necessary to color a specimen, and hence every person can manufacture replicas that have the same tone of colors as the actual object.

Particularly, many persons can manufacture many replicas at the same time using color prints without using a mother mold. As a result, according to the invention, it is possible to provide a method of manufacturing many replicas by many persons at the same time.

Further, since the invention utilizes a color print, it is possible to manufacture replicas for all sorts of objects so that many persons can manufacture beautiful works that are worth seeing from an aesthetic point of view with their free conception.

According to methods of manufacturing overlapping and heaping replicas, it is possible to manufacture not only a specimen of a fossil but also three-dimensional specimens such as imaginary reconstruction, viruses, plants, and also manufacture backgrounds of the replicas so that every person can enjoy creation and presentation.

Since image information, which has not been presented three-dimensionally by persons, can be presented three-dimensionally actually, every person can experience and feel realization. Accordingly, there are effects that even an eyesight handicapped person can experience medical and science specimens, and feel realization and they can perform natural rehabilitation because they use hands, fingers, eyes and brains when manufacturing the replica.

Particularly, the invention is enormously effective for education because many replicas of very precious specimens can be mass-produced if museums or the like utilize the method of the invention.

Finally, since fossils and specimens that are very valuable worldwide are hardly available so far, replicas of such fossils and specimens have not been manufactured so far according to the conventional methods of manufacturing replicas, but it is now possible to manufacture replicas of such fossils and specimen very easily according to the invention if one piece of picture of such fossils, specimens is available.

What is claimed is:

1. A method for producing a heaping replica which mimics a three-dimensional shape and color of a specimen selected from the group consisting of a fossil, an imaginary reconstruction of a fossil, an organism and a crystal, comprising the following steps:

preparing two prints representing the specimen;

producing specimen print films by transferring a pattern of the specimen represented by the prints to a flexible film using a transfer liquid, wherein the transfer liquid is applied on the prints and dried, then the prints applied with the liquid are dipped in water and back papers are peeled off;

forming the shape of the specimen in which plastic material is placed on the first flexible specimen film and the second specimen film is closely placed on the plastic material and then the plastic material is shaped into the specimen in conformity to the irregularities of the pattern of the specimen represented by the second flexible specimen film, wherein the specimen film is not treated with any coating before placed on the plastic material.

2. The method for producing a heaping replica of claim 1, wherein the plastic material is solidified after being shaped.

3. The method for producing a heaping replica of claim 2, wherein the plastic material is clay.

4. The method for producing a heaping replica of claim 1, wherein an adhesive is provided between the first specimen film and the plastic material.

5. The method for producing a heaping replica of claim 1, wherein the second specimen film is similar to and slightly larger than the first specimen print.

6. A method for producing a double-sided heaping replica which mimics a three-dimensional shape and color of a specimen selected from the group consisting of a fossil, an imaginary reconstruction of a fossil, an organism and a crystal, comprising the following steps:

preparing two prints representing the right side of the specimen and two prints representing the reverse side of the specimen;

producing specimen print films by transferring a pattern of the right side of the specimen and the reverse side of the specimen represented by the prints to a flexible films using a transfer liquid, wherein the transfer liquid is applied on the prints and dried, then the prints applied with the liquid are dipped in water and back papers attached thereto are peeled off;

forming the shape of the right side of the specimen in which plastic material is placed on the first flexible specimen film representing the right side of the specimen and the second specimen film representing the right side of the specimen is placed on the plastic material and then the plastic material is shaped into the right side of the specimen in conformity to the irregularities of the pattern of the right side of the specimen represented by the second flexible specimen film, and forming the shape of the reverse side of the specimen in which plastic material is placed on the first flexible specimen film representing the reverse side of the specimen and the second specimen film representing the reverse side of the specimen is placed on the plastic material and then the plastic material is shaped into the reverse side of the specimen in conformity to the irregularities of the pattern of the reverse side of the specimen represented by the second flexible specimen film, wherein the specimen film is treated with a coating.

7. The method for producing a heaping replica of claim 6, wherein the plastic material is solidified after being shaped.

8. The method for producing a heaping replica of claim 6, wherein an adhesive is provided between the first specimen and the plastic material.

9. The method for producing a heaping replica of claim 6, wherein the second specimen film is similar to and slightly larger than the first specimen print.

10. A heaping replica which mimics a three-dimensional shape and color of a specimen selected from the group consisting of a fossil, an imaginary reconstruction of a fossil, an organism and a crystal, comprising two flexible specimen print films to which a pattern of the specimen of the prints representing the specimen using a transfer liquid, the flexible specimen print films not being treated with any coating, and a plastic material which is shaped into the three-dimensional shape of the specimen, wherein the plastic material is shaped on the first film and the second film is closely attached to the plastic material.

11. A double sided heaping replica which mimics a three-dimensional shape and color of a specimen selected from the group consisting of a fossil, an imaginary reconstruction of a fossil, an organism and a crystal, comprising two flexible specimen print films to which a pattern of the right side of the specimen of the prints representing the right side of the specimen using a transfer liquid, the flexible specimen print films not being treated with any coating, and a plastic material which is shaped into the three dimensional shape of the right side of the specimen, wherein the plastic material is shaped on the first film and the second film is closely attached to the plastic material, and two flexible specimen print films to which a pattern of the reverse side of the specimen of the prints representing the reverse side of the specimen using a transfer liquid, the flexible specimen print films not being treated with any coating, and a plastic material which is shaped into the three dimensional shape of the reverse side of the specimen, wherein the plastic material is shaped on the first film and the second film is closely attached to the plastic material.

* * * * *